(12) United States Patent
Strasters

(10) Patent No.: US 8,634,533 B2
(45) Date of Patent: Jan. 21, 2014

(54) DIRECTED NOTIFICATIONS

(75) Inventor: Jeffrey Strasters, McKinney, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 349 days.

(21) Appl. No.: 12/944,460

(22) Filed: Nov. 11, 2010

(65) Prior Publication Data

US 2012/0121075 A1    May 17, 2012

(51) Int. Cl.
*H04M 3/42*    (2006.01)
(52) U.S. Cl.
USPC .................................... 379/211.02; 725/133
(58) Field of Classification Search
USPC ........... 379/211.02, 88.22, 211.01, 93.23, 31, 379/201, 142, 265, 266, 94, 96, 210, 212, 379/158, 137, 188; 455/418
See application file for complete search history.

(56) References Cited

U.S. PATENT DOCUMENTS

| | | | | |
|---|---|---|---|---|
| 5,408,528 A | * | 4/1995 | Carlson et al. | 379/211.02 |
| 8,438,318 B2 | * | 5/2013 | McRae et al. | 710/15 |
| 2002/0169539 A1 | * | 11/2002 | Menard et al. | 701/200 |
| 2005/0054335 A1 | | 3/2005 | Pearson et al. | |
| 2005/0063528 A1 | | 3/2005 | Pearson et al. | |
| 2006/0281447 A1 | * | 12/2006 | Lewis et al. | 455/418 |
| 2007/0121584 A1 | * | 5/2007 | Qiu et al. | 370/352 |
| 2008/0092199 A1 | * | 4/2008 | McCarthy et al. | 725/133 |
| 2008/0101588 A1 | | 5/2008 | Bruce et al. | |
| 2008/0109839 A1 | | 5/2008 | Bruce et al. | |
| 2008/0125098 A1 | | 5/2008 | Bruce et al. | |
| 2012/0275581 A1 | * | 11/2012 | Poder | 379/88.22 |

OTHER PUBLICATIONS

Copeland, Kyle, et al., "Converge Services, Grow Revenue", Jul. 1, 2008.

* cited by examiner

*Primary Examiner* — Maria El-Zoobi
(74) *Attorney, Agent, or Firm* — Toler Law Group, PC

(57) ABSTRACT

A computer-implemented method includes receiving a notification at a network server and directing the notification to a particular address of a plurality of addresses that are associated with a customer premises. The method further includes identifying one or more customer premises equipment (CPE) devices that are designated to receive notifications directed to the particular address based on a directed notification profile that is associated with the customer premises. The directed notification profile may be stored at a lightweight directory access protocol (LDAP) database that is accessible to the network server. The method further includes communicating the notification from the network server to the one or more identified CPE devices.

19 Claims, 7 Drawing Sheets

DIRECTED NOTIFICATIONS

FIELD OF THE DISCLOSURE

The present disclosure is generally related to delivery of notifications.

BACKGROUND

"Caller ID on TV" services may provide information associated with an incoming telephone call (e.g., a telephone number of a calling party provided to a television display). Certain customers may have multiple televisions, and the Caller ID information may be displayed at each of the televisions. Displaying information associated with incoming telephone calls at each of the televisions may be undesirable to certain customers.

DETAILED DESCRIPTION

In a particular embodiment, a computer-implemented method includes receiving a notification at a network server and directing the notification to a particular address of a plurality of addresses that are associated with a customer premises. The method further includes identifying one or more customer premises equipment (CPE) devices that are designated to receive notifications directed to the particular address based on a directed notification profile that is associated with the customer premises. The directed notification profile may be stored at a lightweight directory access protocol (LDAP) database that is accessible to the network server. The method further includes communicating the notification from the network server to the one or more identified CPE devices.

In another particular embodiment, a system includes a processor and an LDAP database that stores a directed notification profile that is associated with a customer premises. The system further includes a non-transitory computer readable storage medium that includes instructions that are executable by a processor. The instructions, when executed by the processor, cause the processor to receive a notification that is directed to a particular address of a plurality of addresses that are associated with the customer premises. The instructions further cause the processor to identify one or more CPE devices that are designated to receive notifications directed to the particular address based on the directed notification profile stored at the LDAP database. The instructions further cause the processor to initiate communication of the notification to the one or more identified CPE devices.

In another particular embodiment, a non-transitory computer readable storage medium includes instructions that are executable by a processor. The instructions, when executed by the processor, cause the processor to receive a notification that is directed to a particular address of a plurality of addresses that are associated with a customer premises. The instructions further cause the processor to identify one or more CPE devices that are designated to receive notifications directed to the first address based on a directed notification profile that is associated with the customer premises. The directed notification profile may be stored at an LDAP database.

Figure 1:
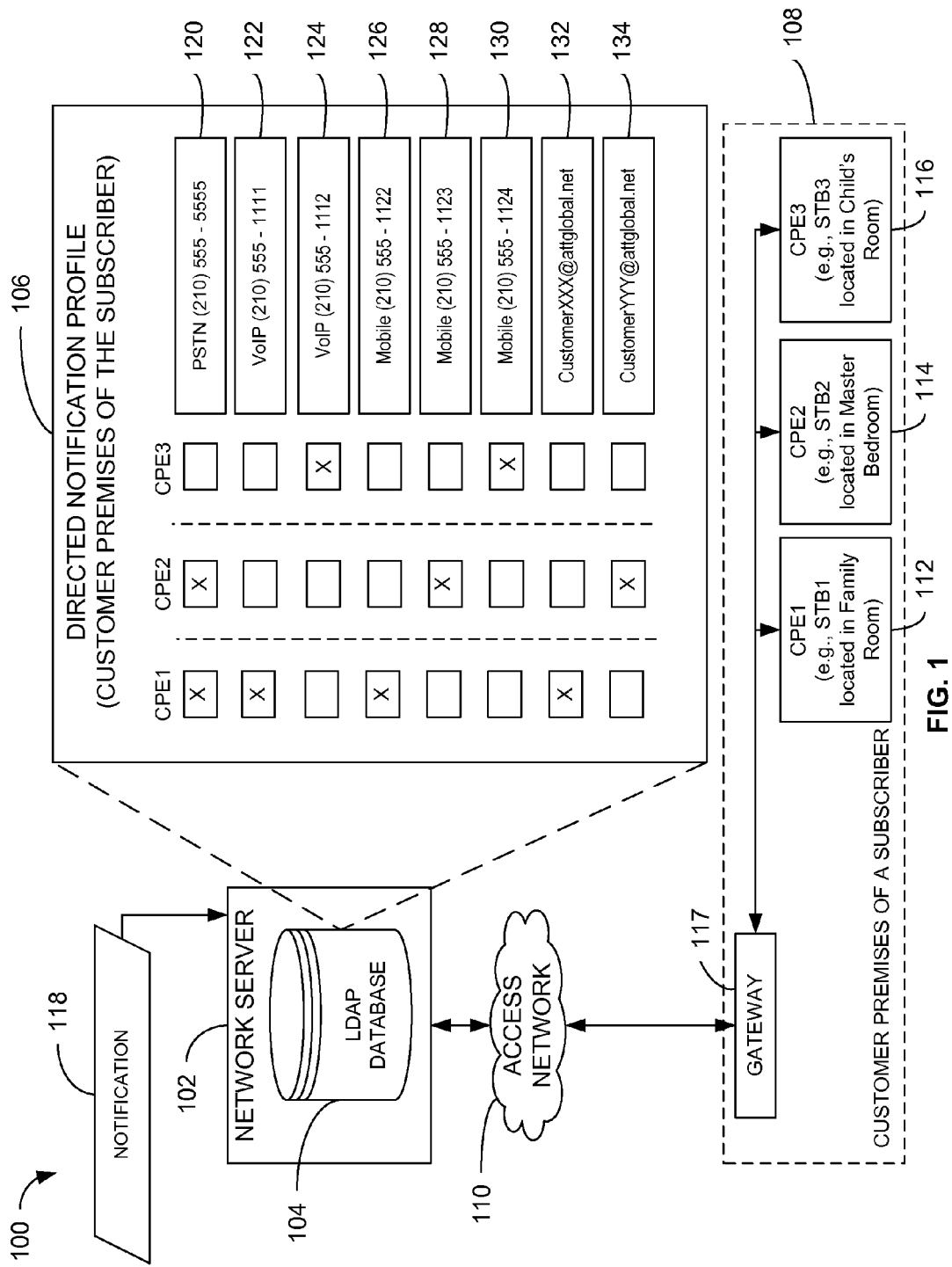
FIG. 1 is a block diagram of a particular embodiment of a directed notifications system.

Referring to FIG. 1, a particular embodiment of a directed notifications system is illustrated and generally designated 100. The system 100 includes a network server 102 and a lightweight directory access protocol (LDAP) database 104 that stores a directed notification profile 106 associated with a customer premises 108 of a subscriber. The network server 102 and the customer premises 108 are communicatively coupled via a network 110 (e.g., an internet protocol television (IPTV) system). The customer premises 108 includes a plurality of customer premises equipment (CPE) devices. For example, in the embodiment illustrated in FIG. 1, the customer premises 108 includes a first CPE device 112, a second CPE device 114, and a third CPE device 116. Alternatively, the customer premises 108 may include any number of CPE devices. In the embodiment illustrated in FIG. 1, a gateway 117 located at the customer premises 108 may be communicatively coupled to the CPE devices 112-116 and to the access network 110. The directed notification profile 106 stored at the LDAP database 104 may enable a subscriber to designate one or more of the CPE devices 112-116 to receive a notification directed to a particular address.

The network server 102 is configured to receive a notification 118 that is directed to a first address of a plurality of addresses associated with the customer premises 108. In the embodiment illustrated in FIG. 1, the plurality of addresses include a public switched telephone network (PSTN) telephone number 120, a first voice over internet protocol (VoIP) telephone number 122, a second VoIP telephone number 124, a first mobile telephone number 126, a second mobile telephone number 128, a third mobile telephone number 130, a first email address 132, and a second email address 134. Alternatively, the plurality of addresses associated with the customer premises 108 may include any number of addresses.

The network server 102 is configured to identify one or more of the CPE devices 112-116 at the customer premises 108 that are designated to receive notifications that are directed to a particular address based on the directed notification profile 106. The directed notification profile 106 may be stored at the LDAP database 104. In the embodiment illustrated in FIG. 1, the LDAP database 104 is stored at the network server 102. Alternatively, the LDAP database 104 may be stored at a separate device that is accessible to the network server 102. The network server 102 is configured to communicate the notification 118 to the one or more identified CPE devices.

In operation, the notification 118 is directed to a first address and is received at the network server 102. For example, the notification 118 may be associated with an incoming PSTN call, an incoming VoIP call, an incoming call to a mobile telephone number, an incoming email, among other alternatives. In response to receiving the notification 118, the network server 102 determines that the first address is associated with the customer premises 108 of the subscriber. The network server 102 may query the LDAP database 104 to determine the directed notifications profile 106 that is associated with the identified customer premises 108. Based on the directed notification profile 106, the network server 102 identifies one or more CPE devices of the plurality of CPE devices 112-116 at the customer premises 108 that are designated to receive notifications that are directed to the first address. In a particular embodiment, at least one of the plurality of CPE devices 112-116 is not designated to receive notifications that are directed to the first address.

To illustrate, the notification 118 may be associated with an incoming PSTN call that is directed to the PSTN telephone number 120 (e.g., a call directed to (210)-555-5555). The directed notification profile 106 may indicate that the first CPE device 112 and the second CPE device 114 are designated to receive notifications that are directed to the PSTN telephone number 120. In this case, the network server 102 may communicate instructions to the first CPE device 112 and the second CPE device 114 to initiate display of information associated with the incoming PSTN call. In one embodiment, the first CPE device 112 and the second CPE device 114 are set-top box (STB) devices, and the information may be displayed via a display device coupled to the STB devices 112, 114. As an example, a telephone number of a calling party (e.g., Caller ID) may be displayed. As another example, an image or other identifier of the calling party may be displayed, among other alternatives. The information may be overlaid or displayed in a picture-in-picture window to avoid disruption of display of media content (e.g., a television program, a video game, etc.).

In the embodiment illustrated in FIG. 1, the first CPE device 112 is located in a family room at the customer premises 108, the second CPE device 114 is located in a master bedroom, and the third CPE device 116 is located in a child's room. Thus, in the case of an incoming PSTN call directed to the first PSTN telephone number 120, caller ID information or other information associated with the calling party may be displayed in the family room and the master bedroom, but not in the child's room. As another example, the directed notification profile 106 may indicate that the first CPE device 112 is designated to receive notifications that are directed to the first VoIP telephone number 122 and that the third CPE device 116 is designated to receive notifications that are directed to the second VoW telephone number 124. In the case of an incoming VoIP call to the first VoIP telephone number 122, caller ID information or other information associated with the calling party may be displayed in the family room, but not in the master bedroom or the child's room. In the case of an incoming VoIP call to the second VoIP telephone number 124, caller ID information or other information associated with the calling party may be displayed in the child's room, but not in the family room or the master bedroom.

The directed notification profile 106 in the embodiment illustrated in FIG. 1 also identifies particular CPE devices that are designated to receive notifications directed to the first mobile telephone number 126, to the second mobile telephone number 128, to the third mobile telephone number 130, to the first email address 132, and to the second email address 134. For example, an incoming call directed to the first mobile telephone number 126 may be directed to the first CPE device 112 (e.g., in the family room), an incoming call directed to the second mobile telephone number 128 may be directed to the second CPE device 114 (e.g., in the master bedroom), and an incoming call directed to the third mobile telephone number 128 may be directed to the third CPE device 114 (e.g., in the child's room). As another example, an incoming email directed to the first email address 132 may be directed to the first CPE device 112 (e.g., in the family room), and an incoming email directed to the second email address 134 may be directed to the second CPE device 114 (e.g., in the master bedroom).

Thus, FIG. 1 illustrates that a subscriber may utilize the directed notification profile 106 to customize which CPE devices of multiple CPE devices located at the customer premises 108 are designated to receive particular types of notifications. For example, the first PSTN telephone number 120 may be a home telephone number associated with the customer premises 108, and the first and second mobile telephone numbers 126, 128 may be mobile telephone numbers of parents. A parent may determine that it may be desirable to avoid distracting a child when a call is directed to the home telephone number or to the mobile telephone numbers of the parents. As another example, the second VOID telephone number 124 and the third mobile telephone number 130 may be phone numbers that are used by the child. In this case, the parent may determine that is may be desirable to avoid being distracted by calls to the child and may direct notifications associated with incoming calls to these numbers to the child's room but not to the family room or to the master bedroom. As yet another example, the first email address 132 may be a work email address of a parent, and the second email address 134 may be a personal email address of the parent. In this case, the subscriber may determine that alerts associated with the work email address are desirable in the family room and that alerts associated with the personal email address are desirable in the master bedroom.

Figure 2:
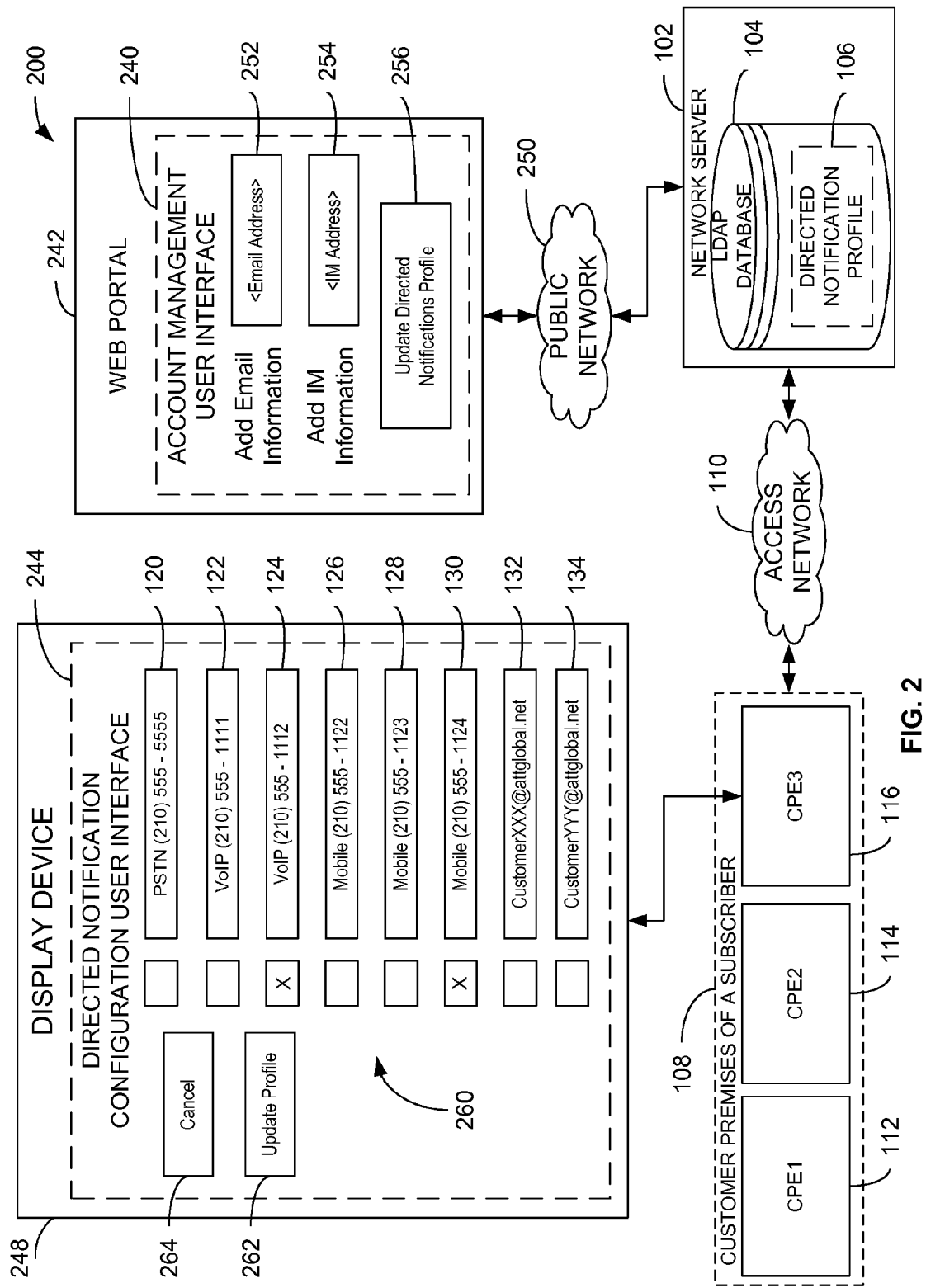
FIG. 2 is a block diagram of a second particular embodiment of a directed notifications system.

Referring to FIG. 2, a particular embodiment of system of configuring a directed notifications system is illustrated and generally designated 200. FIG. 2 illustrates that a user may associate one or more addresses with a customer premises via a web portal. FIG. 2 further illustrates that a user may select one or more addresses to be directed to a particular CPE device via a user interface displayed at a display device associated with the particular CPE device.

The system 200 of FIG. 2 includes a network server 102 and an LDAP database 104 that stores a directed notification profile 106 associated with a customer premises 108 of a subscriber. The network server 102 and the customer premises 108 are communicatively coupled via a network 110 (e.g., a private access network of an IPTV system). In the embodiment illustrated in FIG. 2, the customer premises 108 includes a first CPE device 112, a second CPE device 114, and a third CPE device 116. Alternatively, the customer premises 108 may include any number of CPE devices. The directed notification profile 106 stored at the LDAP database 104 may enable a user (e.g., a subscriber associated with the customer premises 108) to designate one or more CPE devices 112-116 that are to receive a notification directed to a particular address.

An account management user interface 240 may be displayed via a web portal 242 via a public network 250. The account management user interface 240 may enable the user to associate one or more addresses with the customer premises 108. For example, in the embodiment illustrated in FIG. 2, the account management user interface 240 includes a first address input field 252 adapted to receive an email address to be associated with the customer premises 108 of the subscriber. As another example, in the embodiment illustrated in FIG. 2, the account management user interface 240 includes a second address input field 254 adapted to receive an instant messaging (IM) address to be associated with the customer premises 108. The user may select a third selectable input 256 to initiate an update of the directed notification profile 106 stored at the LDAP database 104 of the network server 102.

In a particular embodiment, a service provider associated with the network server 102 may have access to information related to services that are provided by the service provider. In this case, the LDAP database 104 may include such information without receiving input from the user via the account management user interface 240. For example, the service provider may be a telecommunications service provider that provides telephone services (e.g., PSTN, VoIP services), broadband services, and mobile telecommunications services (e.g., mobile telephone services). In this case, one or more addresses associated with these services may be available to the network server 102. Such information may be stored at the LDAP database 104 and included in the directed notification profile 106. To illustrate, the PSTN telephone number 120 (e.g., a home phone line), the first VoIP telephone number 122, and the second VoIP telephone number 124 may be associated with the customer premises 108 without the user providing such information via the account management user interface 240. As another example, wireless telecommunications services may be provided to one or more devices (e.g., provided to wireless telephones that are associated with mobile telephone numbers 126-130). As such, the network server 102 may have access to information associated with an incoming notification that is addressed to one of these mobile telephone numbers 126-130 (e.g., an incoming voice call, an incoming text message, an incoming multimedia message). As a further example, broadband services may be provided to the customer premises 108, and the service provider may have access to information associated with incoming emails directed to the first email address 132 and to the second email address 134. Alternatively, or in addition, the account management user interface 240 may be used to add or remove such addresses from the directed notification profile 106.

A directed notification configuration user interface 244 displayed at a display device 248 associated with a particular CPE device may enable a user of the particular CPE device to designate which notifications are to be directed to the particular CPE device. For example, in the embodiment illustrated in FIG. 2, the display device 248 is communicatively coupled to the third CPE device 116 (e.g., a set-top box device located in a child's room). In this case, the directed notification configuration user interface 244 may be enable the user (e.g., a child or parent) to designate which notifications are to be directed to the third CPE device 116. The user may select one or more of the addresses 120-134 stored in the directed notification profile 106. In one embodiment, the directed notification configuration user interface 244 may be displayed in response to input received from a remote control device associated with the third CPE device 116 (e.g., selection of a hot key on the remote control device or selection via an electronic programming guide (EPG), among other alternatives).

In the embodiment illustrated in FIG. 2, selection of one or more of the addresses 120-134 may be indicated to the user via indicators 260 that are associated with each address. For example, the user may select the second VoIP address 124 and third mobile telephone number 130, and the selections may be indicated via an "X" or other indicator. Alternatively, or in addition, the one or more selected addresses may be indicated via highlighting, color change, or other methods. After selection of the one or more addresses (e.g., the second VoIP address 124 and the third mobile telephone number 130), the user may select a first input 262 to update the directed notification profile 106, or may select another input 264 to cancel the selections. In response to the user electing to update the directed notification profile 106, the one or more selected addresses may be communicated to the LDAP database 104 via the access network 110 (e.g., a private IPTV access network). The directed notification profile 106 may be updated accordingly, such that notifications directed to the one or more selected addresses are communicated from the network server 102 to the particular CPE device. For example, in the embodiment illustrated in FIG. 2, the directed notification profile 106 may be updated such that incoming notifications that are associated with the second VoIP address 124 and third mobile telephone number 130 are directed to the third CPE device 116.

While FIG. 2 illustrates configuration of the directed notification profile 106 with respect to the third CPE device 116, it will be understood the first CPE device 112 and the second CPE device 114 may also be configured via directed notification user interfaces displayed at display devices associated with the CPE devices 112, 114. For example, the directed notification profile 106 illustrated in FIG. 1 may result from the user selecting the PSTN address 120, the first VoIP address 122, the first mobile telephone number 126, and the first email address 132 for the first CPE device 112. As another example, the directed notification profile 106 illustrated in FIG. 1 may result from the user selecting the PSTN address 120, the second mobile telephone number 128, and the second email address 134 for the second CPE device 114.

Thus, FIG. 2 illustrates that the account management user interface 240 may enable the user to associate one or more addresses (e.g., email or instant messaging addresses) with the customer premises 108 via the web portal 242 (that is communicatively coupled to the network server 102 via the public network 250. Further, FIG. 2 illustrates that the directed notification configuration user interface 244 may enable a user of a particular CPE device to select one or more addresses for which notifications are to be directed to the particular CPE device. The one or more selected addresses may be communicated to the LDAP database 104 via the access network 110 (e.g., a private IPTV access network), and the directed notification profile 106 may be updated accordingly.

Figure 3:
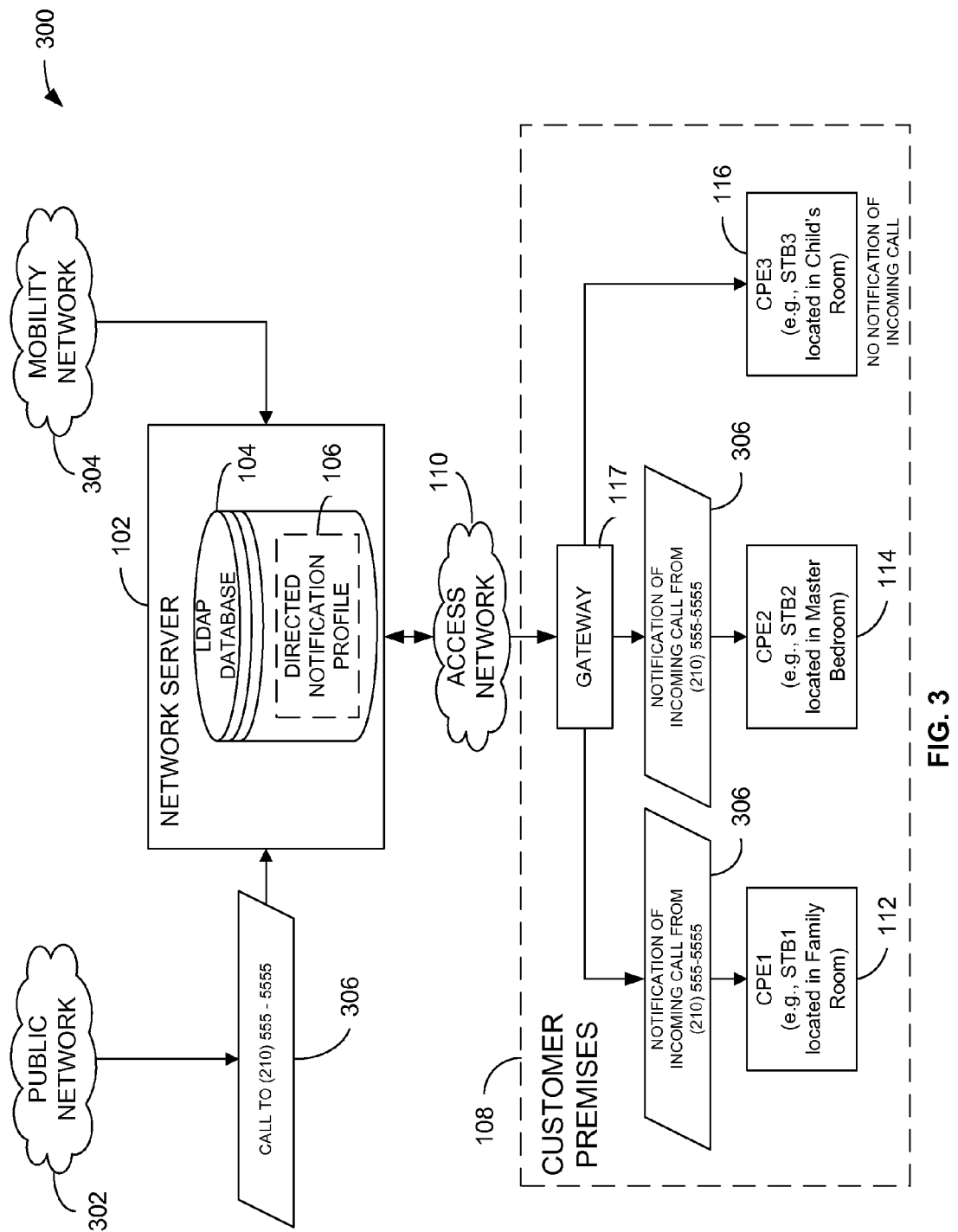
FIG. 3 is a block diagram of a third particular embodiment of a directed notifications system.

Referring to FIG. 3, a first illustrative embodiment of a system of selectively directing notifications is illustrated and generally designated 300. FIG. 3 illustrates selective delivery of notifications to particular CPE devices according to the directed notification profile 106 of FIG. 1. In the embodiment illustrated in FIG. 3, the network server 102 is communicatively coupled to a public network 302 (e.g., the public network 250 of FIG. 2), and to a mobility network 304.

FIG. 3 illustrates an example of selective delivery of a notification 306 that is associated with an incoming PSTN call, according to the directed notification profile 106. In a particular embodiment, the notification 306 of FIG. 3 corresponds to the notification 118 of FIG. 1. As illustrated in FIG. 1, the directed notification profile 106 may identify the first CPE device 112 and the second CPE device 114 as designated to receive notifications that are directed to the PSTN address 120 (e.g., telephone calls to the telephone number (210) 555-5555). Further, the directed notification profile 106 may identify the third CPE device 116 as not designated to receive notifications that are directed to the PSTN address 120.

In operation, the network server 102 receives the notification 306 of the incoming call to the PSTN address 120. For example, the notification 306 may include Caller ID information associated with a calling party. The network server 102 may identify the PSTN address 120 as associated with the customer premises 108. The network server 102 may identify the directed notification profile 106 stored at the LDAP database 104 that is associated with the customer premises 108. Based on the directed notification profile 106 associated with the customer premises 108, the network server 102 may determine that the notification 306 is to be directed to the first CPE device 112 and to the second CPE device 114. Further, the notification 306 is not to be displayed at the third CPE device 116.

In one embodiment, the network server 102 may determine a first identifier associated with the first CPE device 112 (e.g., a first MAC address) and a second identifier associated with the second CPE device 114 (e.g., a second MAC address). The notification 306 and the identifiers may be communicated to the gateway 117, and the gateway 117 may determine that the CPE devices 112, 114 are to receive the notification 306. In an alternative embodiment, the directed notification profile 106 may be accessible to the gateway 117. For example, a copy of the directed notification profile 106 may be stored at the customer premises 108 (e.g., at the gateway 117). In this case, the network server 102 may send the notification 306 to the gateway 117, and the gateway 117 may determine that the notification 306 is to be directed to the CPE devices 112, 114 using the copy of the directed notification profile 106.

While FIG. 3 illustrates selective delivery of notifications associated with an incoming PSTN call to the PSTN address 120, it will be understood that other types of incoming notifications may also be selectively delivered according to the directed notification profile 106. For example, the directed notification profile 106 (as illustrated in FIG. 1) may identify the first CPE device 112 as designated to receive a notification of an incoming call to the first VoIP address 122 (and that the second CPE device 114 and the third CPE device 116 are not to receive such notifications). As another example, a notification of an incoming call to the first VoIP address 124 may be selectively directed to the first CPE device 112, and a notification of an incoming call to the second VoIP address 126 may be selectively directed to the third CPE device 116. As a further example, notifications associated with the first mobile telephone number 126 (e.g., incoming calls or incoming messages) may be selectively directed to the first CPE device 112, notifications associated with the second mobile telephone number 128 may be selectively directed to the second CPE device 114, and notifications associated with the third mobile telephone number 128 may be selectively directed to the third CPE device 116. As another example, a notification of an incoming email to the first email address 132 may be selectively directed to the first CPE device 112, and a notification of an incoming email to the second email address 134 may be selectively directed to the second CPE device 114.

Figure 4:
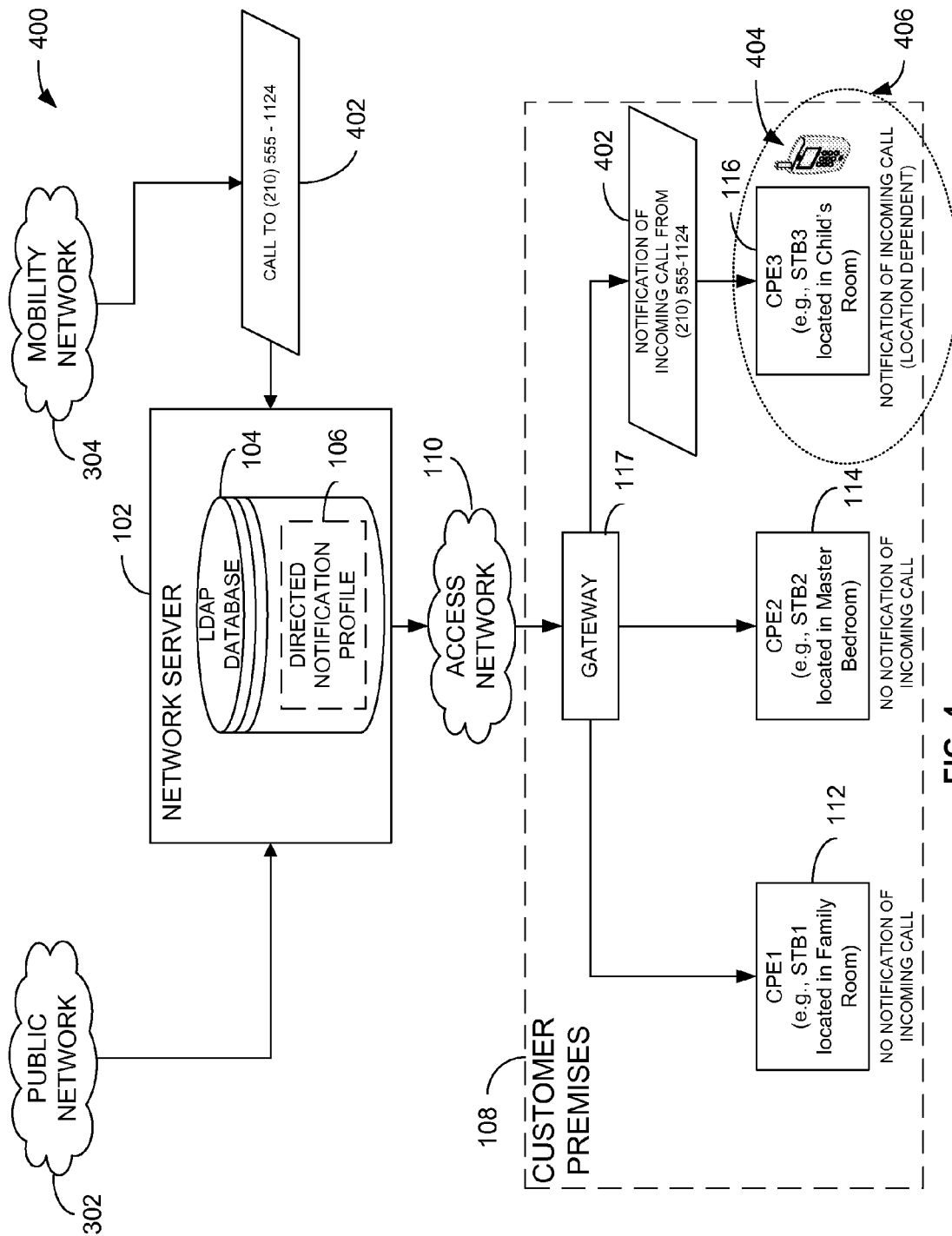
FIG. 4 is a block diagram of a fourth particular embodiment of a directed notifications system.

Referring to FIG. 4, a second illustrative embodiment of a system of selectively directing notifications is illustrated and generally designated 400. FIG. 4 illustrates selective delivery of notifications to particular CPE devices according to the directed notification profile 106 of FIG. 1 and based on a location of a mobile device.

FIG. 4 illustrates an example of selective delivery of a notification 402 associated with an incoming call that is directed to a mobile telephone number, according to the directed notification profile 106. In a particular embodiment, the notification 402 of FIG. 4 corresponds to the notification 118 of FIG. 1. As illustrated in FIG. 1, the directed notification profile 106 may identify the third CPE device 116 as designated to receive notifications that are directed to the third mobile telephone number 130 (e.g., telephone calls or other messages directed to the telephone number (210) 555-1124). Further, the directed notification profile 106 may identify the first CPE device 112 and the second CPE device 114 as not designated to receive notifications that are directed to the third mobile telephone number 130.

In operation, the network server 102 receives the notification 402 of an incoming call to the third mobile telephone number 130. For example, the notification 402 may include Caller ID information associated with a calling party. The network server 102 may identify the mobile telephone number as associated with the customer premises 108. The network server 102 may identify the directed notification profile 106 stored at the LDAP database 104 that is associated with the customer premises 108. Based on the directed notification profile 106 associated with the customer premises 108, the network server 102 may determine that the notification 402 is to be directed to the third CPE device 112 and not to the first CPE device 112 or to the second CPE device 114.

FIG. 4 illustrates that a notification may be selectively displayed based on a location of a mobile device 404 associated with the third mobile telephone number 130. For example, when the mobile device 404 is not located within the customer premises 108, the notification 402 may not be displayed. As another example, when the mobile device 404 is not located within a predetermined range 406 of a particular CPE device (e.g., the third CPE device 116, in this case), the notification 402 may not be displayed.

In a particular embodiment, the location of the mobile device 404 may be determined based on location information accessible to the network server 102 (e.g., based on global positioning system (GPS) coordinates). In an alternative embodiment, one or more of the CPE devices 112-116 or the gateway may determine the location of the mobile device 404 (e.g., via Bluetooth or other short-range communication methods). In the embodiment illustrated in FIG. 4, the mobile device 404 is located within the customer premises 108. As such, the notification 402 may be displayed at a display device associated with the third CPE device 116.

The location of the mobile device 404 may be used to determine whether the mobile device 404 is within the predetermined range 406 of a particular CPE device. When the mobile device 404 is not within the predetermined range 406, the notification 402 may not be displayed. In the embodiment illustrated in FIG. 4, the mobile device 404 is within the predetermined range 406. As such, the notification 402 may be displayed at the third CPE device 116. In alternative embodiments, when the directed notification profile 106 indicates that the notification 402 is to be directed to more than one CPE device, the notification 402 may be displayed at one or more of the designated CPE devices but may not be displayed at other CPE devices. To illustrate, the directed notification profile 106 may indicate that at least one of the first CPE device 112 and the second CPE device 114 are to receive the notification 402 in addition to the third CPE device 116. As an example, the directed notification profile 106 may indicate that each of the CPE devices 112-116 is designated to receive the notification 402. In this case, the mobile device 404 may be located within the predetermined range of the third CPE device 116 but not within the predetermined ranges of either the first CPE device 112 or the second CPE device 114. As a result, the notification 402 may be displayed at the third CPE device 116 but not at the first CPE device 112 or at the second CPE device 114. Alternatively, the mobile device 404 may be located within the predetermined range of the third CPE device 116 and within the predetermined range of either the first CPE device 112 or the second CPE device 114. As a result, the notification 402 may be displayed at the third CPE device 116 and one or both of the other CPE devices 112, 114.

Thus, FIG. 4 illustrates that selective delivery of notifications may depend on both the directed notification profile 106 and the location of the mobile device 404 with respect to either the customer premises 108 or with respect to one or more of the CPE devices 112-116 within the customer premises 108.

Figure 5:
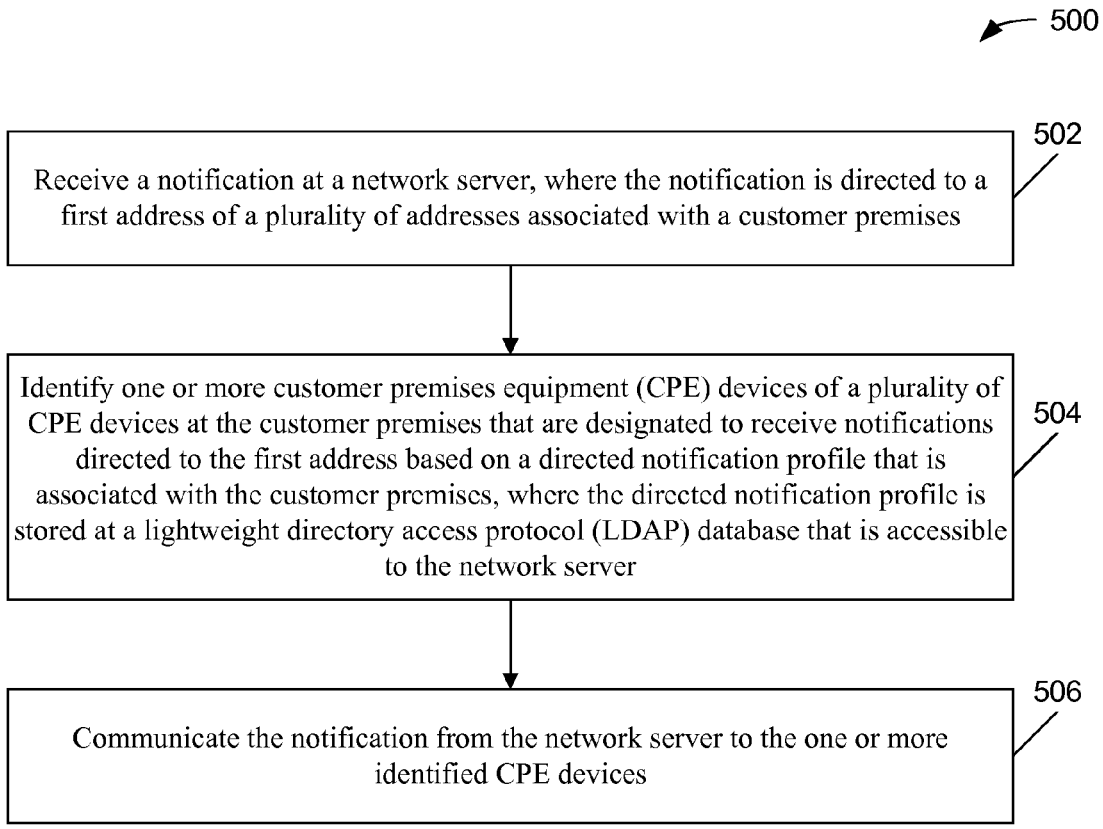
FIG. 5 is a flow chart of a first particular embodiment of a method of directing notifications.

Referring to FIG. 5, a first illustrative embodiment of a directed notifications method is illustrated and generally designated 500. The method includes receiving a notification at a network server, at 502. The notification is directed to a first address of a plurality of addresses associated with a customer premises. For example, the network server 102 of FIG. 3 may receive the notification 306 that is directed to the PSTN address 120 that is associated with the customer premises 108. As another example, the network server 102 of FIG. 4 may receive the notification 402 that is directed to the third mobile telephone number 130 that is associated with the customer premises 108.

The method includes identifying one or more CPE devices of a plurality of CPE devices at the customer premises that are designated to receive notifications that are directed to the first address based on a directed notification profile that is associated with the customer premises, at 504. The directed notification profile is stored at an LDAP database that is accessible to the network server. For example, the network server 102 of FIG. 3 may identify the first CPE device 112 and the second CPE device 114 as designated to receive notifications that are directed to the PSTN address 120 based on the directed notification profile 106. As another example, the network server 102 of FIG. 4 may identify the third CPE device 116 as designated to receive notifications that are directed to the third mobile telephone number 130 based on the directed notification profile 106.

The method includes initiating communication of the notification from the network server to the one or more identified CPE devices, at 506. For example, the network server 102 of FIG. 3 may initiate communication of the notification 306 to the first CPE device 112 and the second CPE device 114. As another example, the network server 102 of FIG. 4 may initiate communication of the notification 402 to the third CPE device 116.

Figure 6:
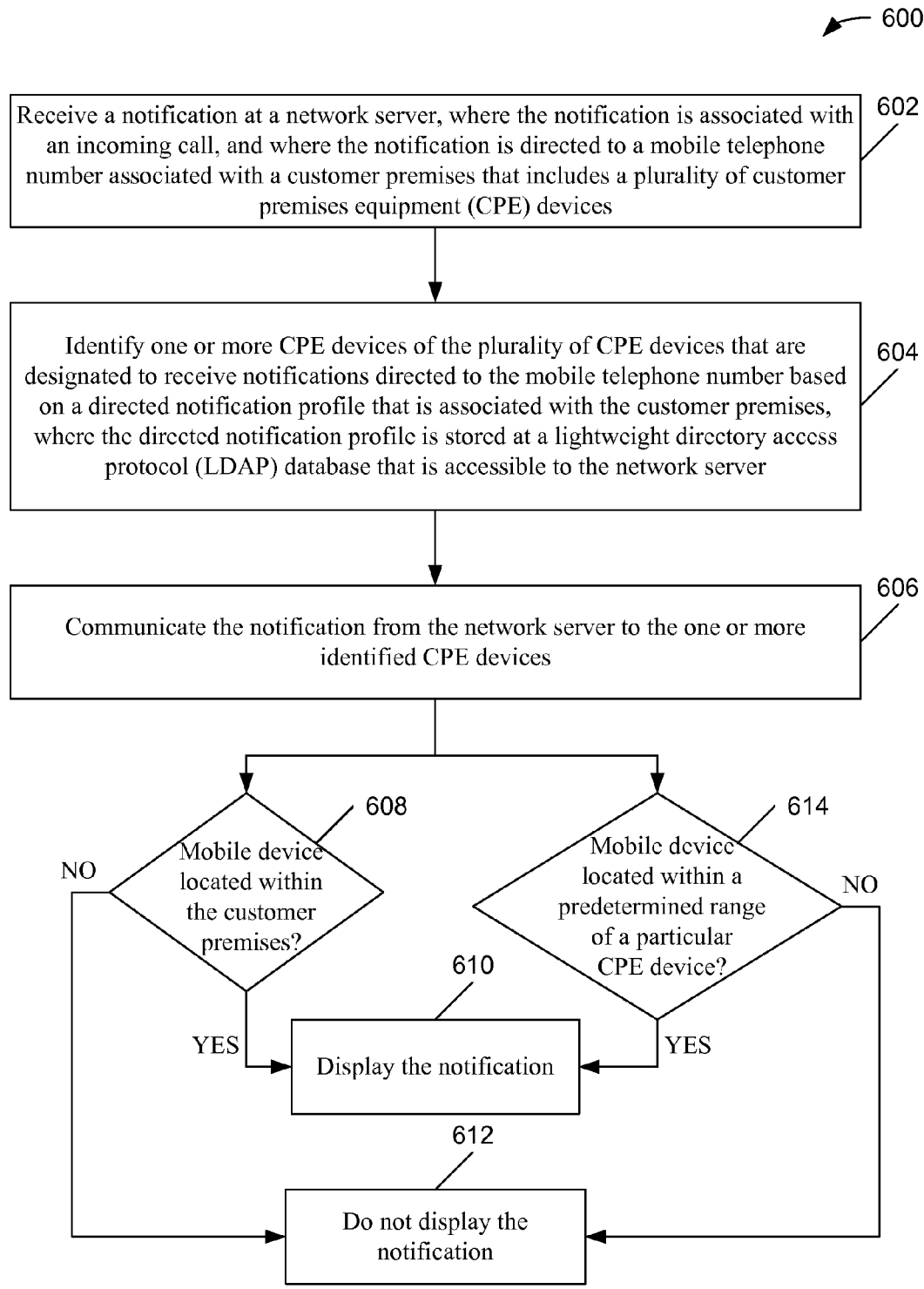
FIG. 6 is a flow chart of a second particular embodiment of a method of directing notifications.

Referring to FIG. 6, a second illustrative embodiment of a directed notifications method is illustrated and generally designated 600. The method includes receiving a notification at a network server, at 602. The notification is associated with an incoming call and is directed to a mobile telephone number associated with a customer premises that includes a plurality of CPE devices. For example, the network server 102 of FIG. 4 may receive the notification 402 of the incoming call to the third mobile telephone number 130.

The method includes identifying one or more CPE devices of the plurality of CPE devices at the customer premises that are designated to receive notifications that are directed to the mobile telephone number based on a directed notification profile that is associated with the customer premises, at 604. The directed notification profile is stored at an LDAP database that is accessible to the network server. For example, the third CPE device 116 of FIG. 4 may be designated to receive notifications that are directed to the third mobile telephone number 130.

The method may include initiating communication of the notification from the network server to the one or more identified CPE devices, at 606. Alternatively, a location of a mobile device associated with the mobile telephone number may be accessible to the network server. In this case, when the mobile device is not located within the customer premises or within a predetermined range of a particular identified CPE device, the notification may not be communicated from the network server to the one or more CPE devices of the customer premises. In the embodiment illustrated in FIG. 6, the method includes determining a location of the mobile device after communicating the notification to the one or more identified CPE devices.

The method may include determining whether the mobile device is located within the customer premises, at 608. When the mobile device is located within the customer premises, the notification may be displayed, at 610. When the mobile device is not located within the customer premises, the method may include not displaying the notification, at 612. To illustrate, when the mobile device 404 of FIG. 4 is located within the customer premises 108, the notification 402 may be displayed via the third CPE device 116. When the mobile device 404 of FIG. 4 is not located within the customer premises 108, the notification 402 may not be displayed.

Alternatively or in addition, the method may include determining whether a mobile device is within a predetermined range of a particular CPE device, at 614. When the mobile device is located within the predetermined range, the notification may be displayed, at 610. When the mobile device is not located within the predetermined range, the method may include not displaying the notification, at 612. To illustrate, when the mobile device 404 of FIG. 4 is located within the predetermined range 406 of the third CPE device 116, the notification 402 may be displayed via the third CPE device 116. When the mobile device 404 of FIG. 4 is not located within the predetermined range 406, the notification 402 may not be displayed.

Figure 7:
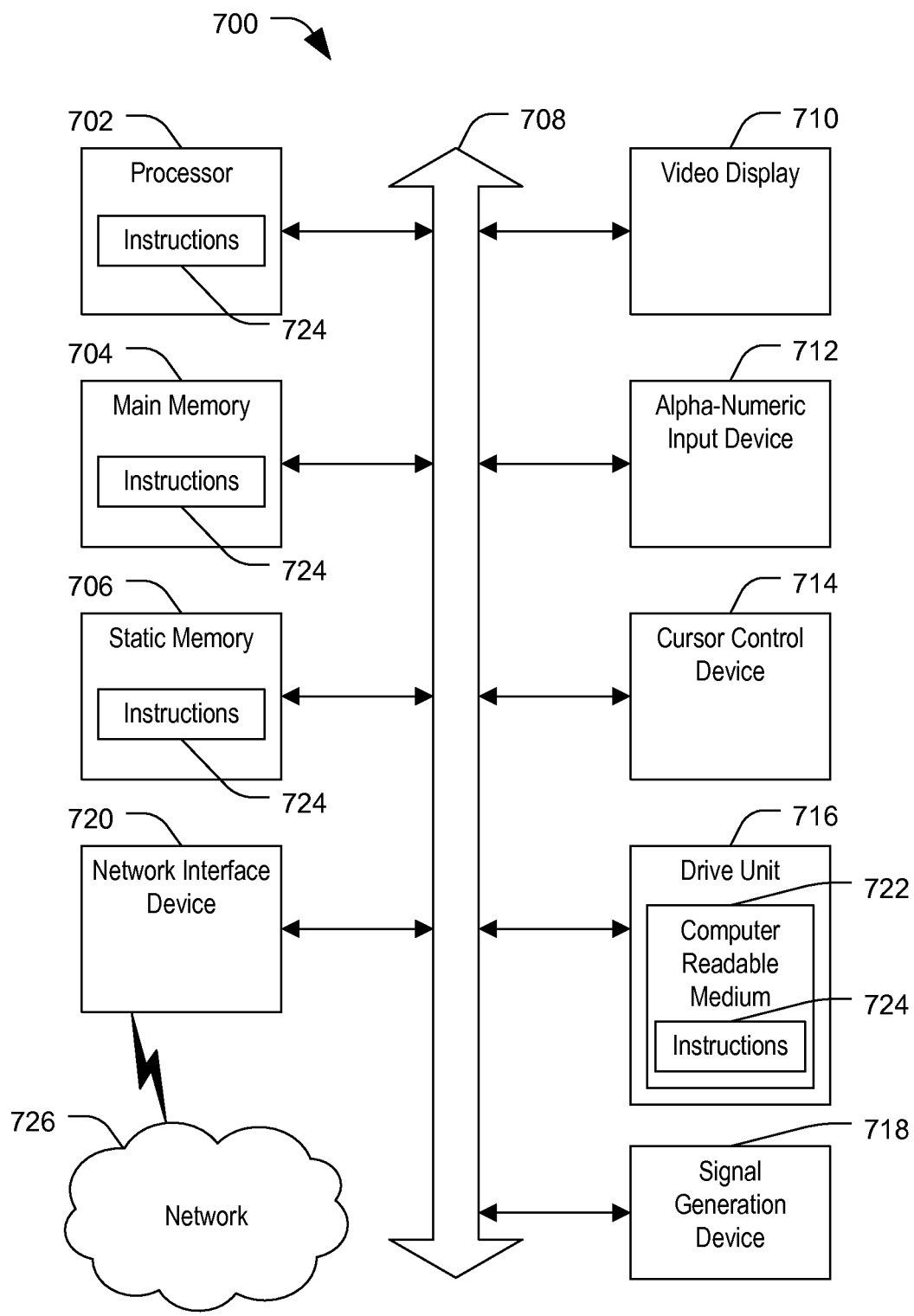
FIG. 7 is an illustration of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices. For example, the general computer system 700 may include or be included within the network server 102, the LDAP database 104, the gateway 117, the CPE devices 112-116, and the mobile device 404 illustrated in FIGS. 1-4.

In a networked deployment, the computer system 700 may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, or a solid state display. Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an illustrative embodiment, the computer system 700 may include the network server 102 of FIGS. 1-4, and the instructions 724 may include instructions that cause the processor 702 to receive a notification that is directed to a particular address of a plurality of addresses that are associated with a customer premises. To illustrate, the instructions 724 may further cause the processor 702 to identify one or more customer premises equipment (CPE) devices of a plurality of CPE devices at the customer premises that are designated to receive notifications that are directed to the particular address based on a directed notification profile that is associated with the customer premises. The directed notification profile is stored at an LDAP database (that may be stored at the computer readable medium 722 or that may be accessible via the network 726). The instructions 724 may further cause the processor to initiate communication of the notification to the one or more identified CPE devices (e.g., via the network 726).

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a tangible non-transitory computer-readable medium that includes instructions 724 or receives and executes instructions 724, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally; the computer-readable medium can include a magneto-optical or optical medium, such as a disk or tapes or other storage device. Accordingly, the disclosure is considered to include a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP, Bluetooth) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method, comprising:
    receiving a notification at a network server, wherein the notification is directed to a particular address of a plurality of addresses associated with a customer premises;
    identifying, at the network server, a customer premises equipment device of a plurality of customer premises equipment devices at the customer premises to receive the notification based on a directed notification profile that is associated with the customer premises, wherein the directed notification profile indicates that:
        first notifications directed to a first address of the plurality of addresses are to be communicated to a first customer premises equipment device of the plurality of customer premises equipment devices and to a second customer premises equipment device of the plurality of customer premises equipment devices; and
        second notifications directed to a second address of the plurality of addresses are to be communicated to the first customer premises equipment device and not communicated to the second customer premises equipment device;
    in response to determining, at the network server, that the particular address is associated with a mobile device:
        overriding the directed notification profile by refraining from sending the notification to the identified customer premises equipment devices when the mobile device is not located within the customer premises; and
        initiating communication of the notification from the network server to the identified customer premises equipment devices when the mobile device is located within the customer premises.

2. The method of claim 1, wherein the directed notification profile further indicates that the first notifications and the second notifications are not to be communicated to a third customer premises equipment device.

3. The method of claim 1, wherein the notification is associated with an incoming public switched telephone network call, and wherein the particular address is a telephone number.

4. The method of claim 1, wherein the notification is associated with an incoming voice over internet protocol call, and wherein the particular address is a telephone number.

5. The method of claim 1, wherein the notification is associated with an incoming call, and wherein the particular address is a mobile telephone number.

6. The method of claim 1, wherein the notification is associated with an incoming email message, and wherein the particular address is an email address.

7. The method of claim 6, wherein an account management user interface that is displayed via a web portal enables a user to associate the email address with the customer premises.

8. The method of claim 1, wherein a directed notification configuration user interface that is displayed at a display device associated with a particular customer premises equipment device of the plurality of customer premises equipment devices enables a user of the particular customer premises equipment device to select an address of the plurality of addresses associated with the customer premises, wherein notifications that are directed to the selected address are to be communicated from the network server to the particular customer premises equipment device.

9. The method of claim 8, wherein the directed notification profile is updated such that third notifications directed to the selected address are communicated from the network server to the particular customer premises equipment device.

10. The method of claim 1, wherein the notification is communicated to the identified customer premises equipment devices via a gateway that is coupled to the plurality of customer premises equipment devices at the customer premises.

11. An apparatus comprising a memory that stores instructions that, when executed by a processor, cause the processor to perform operations including:
    receiving, at a network server, a notification that is directed to a particular address of a plurality of addresses associated with a customer premises;
    identifying customer premises equipment devices of a plurality of customer premises equipment devices at the customer premises to receive the notification based on a directed notification profile that is associated with the customer premises, wherein the direct notification profile indicates that:
        first notifications directed to a first address are to be communicated to a first customer premises equipment device and communicated to a second customer premises equipment device; and
        second notifications directed to a second address are to be communicated to the first customer premises equipment device and not communicated to the second customer premises equipment device;
    in response to determining, at the network server, that the particular address is associated with a mobile device:
        overriding the directed notification profile by refraining from sending the notification to the identified customer premises equipment devices when the mobile device is not located within the customer premises; and
        initiating communication of the notification to the identified customer premises equipment devices when the mobile device is located within the customer premises.

12. The apparatus of claim 11, wherein the operations further include:
    receiving an address via a web portal; and
    updating the directed notification profile to add the received address to the plurality of addresses associated with the customer premises.

13. The apparatus of claim 11, wherein the operations further include:
    receiving a selection of a selected address via a directed notification configuration user interface that is displayed at a display device associated with a particular customer premises equipment device of the plurality of customer premises equipment devices; and updating the directed notification profile such that third notifications directed to the selected address are communicated to the particular customer premises equipment device.

14. A system comprising:
a processor;
a database that stores a directed notification profile that is associated with a customer premises, wherein the directed notification profile indicates that:
first notifications directed to a first address are to be communicated to a first customer premises equipment device and communicated to a second customer premises equipment device; and
second notifications directed to a second address are to be communicated to the first customer premises equipment device and not communicated to the second customer premises equipment device; and
a memory storing instructions that, when executed by the processor, cause the processor to perform operations including:
receiving, at a network server, a notification that is directed to a particular address of a plurality of addresses associated with the customer premises;
identifying customer premises equipment devices of a plurality of customer premises equipment devices at the customer premises that are to receive the notification directed to the particular address based on the directed notification profile; and
in response to determining, at a network server, that the particular address is associated with a mobile device:
overriding the directed notification profile by refraining from sending the notification to the identified customer premises equipment devices when the mobile device is not located within the customer premises; and
initiating communication of the notification to the identified customer premises equipment devices when the mobile device is located within the customer premises.

15. The system of claim 14, wherein the notification is received from one of a public switched telephone network, a mobile telephone network, and the Internet.

16. The system of claim 14, wherein the notification is communicated to the identified customer premises equipment devices via an access network of an internet protocol television system.

17. The method of claim 1, wherein the identified customer premises equipment devices include a first set of customer premises equipment devices that are within a predetermined range of the mobile device, and a second set of customer premises equipment devices that are not within the predetermined range of mobile devices, and further comprising, in response to determining that the first address corresponds to a mobile phone number, overriding the directed notification profile by sending the notification from the network server to the first set of customer premises equipment devices, and refraining from sending the notification to the second set of customer premises devices.

18. The method of claim 17, wherein the network server determines whether the mobile device is within the predetermined range based location information received from the mobile device, location information received from the plurality of customer premises equipment devices, or any combination thereof.

19. The method of claim 1, further comprising, in response to determining, at the network server, that the second address corresponds to a mobile phone number, refraining from sending the notification to the second customer premises equipment device when the second customer premises equipment device is within range of the mobile device.

* * * * *